United States Patent
Tharappel et al.

(10) Patent No.: US 8,542,662 B2
(45) Date of Patent: *Sep. 24, 2013

(54) METHOD AND APPARATUS FOR SECURING DEVICES IN A NETWORK

(75) Inventors: Francis M. Tharappel, Portland, OR (US); Ajay Garg, Portland, OR (US); Nandakishore R. Kushalnagar, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/455,000

(22) Filed: Apr. 24, 2012

(65) Prior Publication Data

US 2012/0210132 A1  Aug. 16, 2012

Related U.S. Application Data

(63) Continuation of application No. 10/954,252, filed on Sep. 29, 2004, now Pat. No. 8,179,870.

(51) Int. Cl.
*H04W 4/00* (2009.01)

(52) U.S. Cl.
USPC .......................... 370/338; 370/449; 713/166

(58) Field of Classification Search
USPC ......... 370/338, 449, 400, 401, 422; 713/182, 713/175, 176, 168, 170; 726/2, 3, 4, 14
See application file for complete search history.

(56) References Cited

U.S. PATENT DOCUMENTS

| | | | | |
|---|---|---|---|---|
| 7,003,282 B1* | 2/2006 | Ekberg | .......................... | 455/411 |
| 7,039,037 B2* | 5/2006 | Wang et al. | .................... | 370/349 |
| 7,382,791 B2* | 6/2008 | Thermond | ..................... | 370/401 |
| 2004/0057430 A1* | 3/2004 | Paavolainen | ................... | 370/390 |
| 2004/0066787 A1* | 4/2004 | Butler et al. | .................. | 370/401 |
| 2004/0068668 A1* | 4/2004 | Lor et al. | ....................... | 713/201 |
| 2004/0181603 A1* | 9/2004 | Rajahalme | .................... | 709/230 |
| 2004/0243846 A1* | 12/2004 | Aboba et al. | ................... | 713/201 |
| 2005/0008160 A1* | 1/2005 | Izawa et al. | ................... | 380/270 |
| 2005/0021781 A1* | 1/2005 | Sunder et al. | ................. | 709/229 |
| 2005/0054342 A1* | 3/2005 | Otsuka | ........................ | 455/426.2 |
| 2005/0091483 A1* | 4/2005 | Fascenda | ...................... | 713/153 |
| 2005/0138410 A1* | 6/2005 | Masuouka et al. | ............. | 713/200 |
| 2005/0163096 A1* | 7/2005 | Momona | ....................... | 370/349 |
| 2005/0188193 A1* | 8/2005 | Kuehnel et al. | ............... | 713/155 |
| 2005/0226175 A1* | 10/2005 | Gupta et al. | ................... | 370/310 |
| 2005/0266823 A1* | 12/2005 | Cathelin et al. | ............... | 455/344 |
| 2005/0272420 A1* | 12/2005 | Matsuda et al. | ........... | 455/426.2 |
| 2005/0283619 A1* | 12/2005 | Min | ............................ | 713/182 |
| 2006/0059003 A1* | 3/2006 | Requena et al. | ................... | 705/1 |
| 2007/0162674 A1* | 7/2007 | Leichsenring et al. | ........ | 710/241 |

* cited by examiner

*Primary Examiner* — Gary Mui
(74) *Attorney, Agent, or Firm* — Marger Johnson & McCollom PC

(57) ABSTRACT

An access point receives a notification (or advertisement) from a device, which lacks a service. The access point adds the service to the notification, and forwards the notification to other devices on the network. Upon receiving from a control point a request to use the added service, the access point provides the service on behalf of the device.

20 Claims, 10 Drawing Sheets

METHOD AND APPARATUS FOR SECURING DEVICES IN A NETWORK

CROSS REFERENCE TO RELATED PATENT APPLICATIONS

This application is a continuation of U.S. patent application Ser. No. 10/954,252, entitled "METHOD AND APPARATUS FOR SECURING DEVICES IN A NETWORK" and filed Sep. 29, 2004, now U.S. Pat. No. 8,179,870, which is hereby incorporated by reference herein in its entirety.

FIELD

This invention pertains to networks, and more particularly to networks with insecure devices.

BACKGROUND

Local networks today, especially personal networks, may vary over time. Users may add and remove network elements to suit their individual needs at particular times. It is becoming common to have many PCs and other computing devices such scanner, printers, and so on.

Where the networks are wireline networks (that is, all of the elements operate solely over wires connecting the various devices), adding a new device requires physically connecting the new device to the network. Because a physical connection is required to a wireline network, it is difficult for an intruder to break into the wireline network and to utilize the devices on the network. The most commonly used attack depends on taking advantage of existing connections to external networks: e.g., a connection to the Internet. By exploiting known vulnerabilities in the operating systems of the devices, an intruder may gain access to the devices without physically penetrating the network.

Wireless networks, on the other hand, may be much easier to penetrate. Wireless networks may, of course, be penetrated over a connection to an external network, just like a wireline network. But wireless networks may also be accessed directly. Unless the wireless access point is secured (something not enabled by default from most wireless networking companies, and typically ignored by most users) and uses a sufficiently strong encryption algorithm, any device within range of the wireless access point may be added to the network. An entire subculture has developed around this point. Some computer users drive around, looking for open wireless access points that they may use. Sometimes, these users are simply looking for free bandwidth onto the Internet. But some of these users take advantage of the lack of security to peruse through user's files, or to engage in more malicious acts. To aid others in taking similar advantage of insecure wireless access points, these users engage in "warchalking": leaving marks visible on the street that show what is available and how to access it. (Warchalking is very reminiscent of the coded symbols used by hobos during the Great Depression, to alert other hobos what places to visit or avoid.)

As suggested above, there are ways to keep a wireless network secure. The wireless access points may be configured to permit communications only with identified and recognized devices in infrastructure mode, a commonplace approach. For example, if a user has two computers on the wireless network in infrastructure mode, the wireless access point may be instructed to permit communications with only those devices, and to reject communications from other computers. (The wireless access point recognizes the computers using Media Access Control (MAC) numbers, which are typically unique to each networking card and are transmitted to the wireless access point. While this level of security may be defeated by "cloning" the MAC number, most hackers would not spend the time necessary to break into a network secured this way, preferring instead to hack into a less secure network.)

Another way to secure the network is for devices to require that the other devices on the network with which they communicate use a security service. Such a security service is a segment of code built into the device, and which is satisfied before the device carries out any other services on behalf of a requesting device. Such a security service is part of the UPnP Device Security 1.0 standard, published Nov. 17, 2003, a copy of which may be found online at http://##www.upnp.org#standardizeddcps#documents#DeviceSecurity_1.0cc_001.pdf (to avoid inadvertent hyperlinks, forward slashes ("/") in the preceding uniform resource locator (URL) have been replaced with pound signs ("#")). (Related UPnP security standards and other documents may be found at http:##www.upnp.org#standardizeddcps#security.asp and http:##www.upnp.org#standardizeddcps#default.asp.)

But the UPnP Device Security 1.0 standard is a new standard, being developed only recently. UPnP, standing for "Universal Plug and Play," allows devices to identify themselves to the network automatically, avoiding the need for manual configuration. UPnP devices operate by broadcasting their identity to the network and listening for responses from any other devices interested in using them. Devices that came out before the adoption of UPnP Device Security 1.0 most likely do not comply with the standard, if they offer any device security at all. While firmware updates could introduce compliant security services to these devices, such updates will happen only if the device manufacturers develop firmware updates to add device security.

Embodiments of the invention address these problems and others in the art.

DETAILED DESCRIPTION

Figure 1:
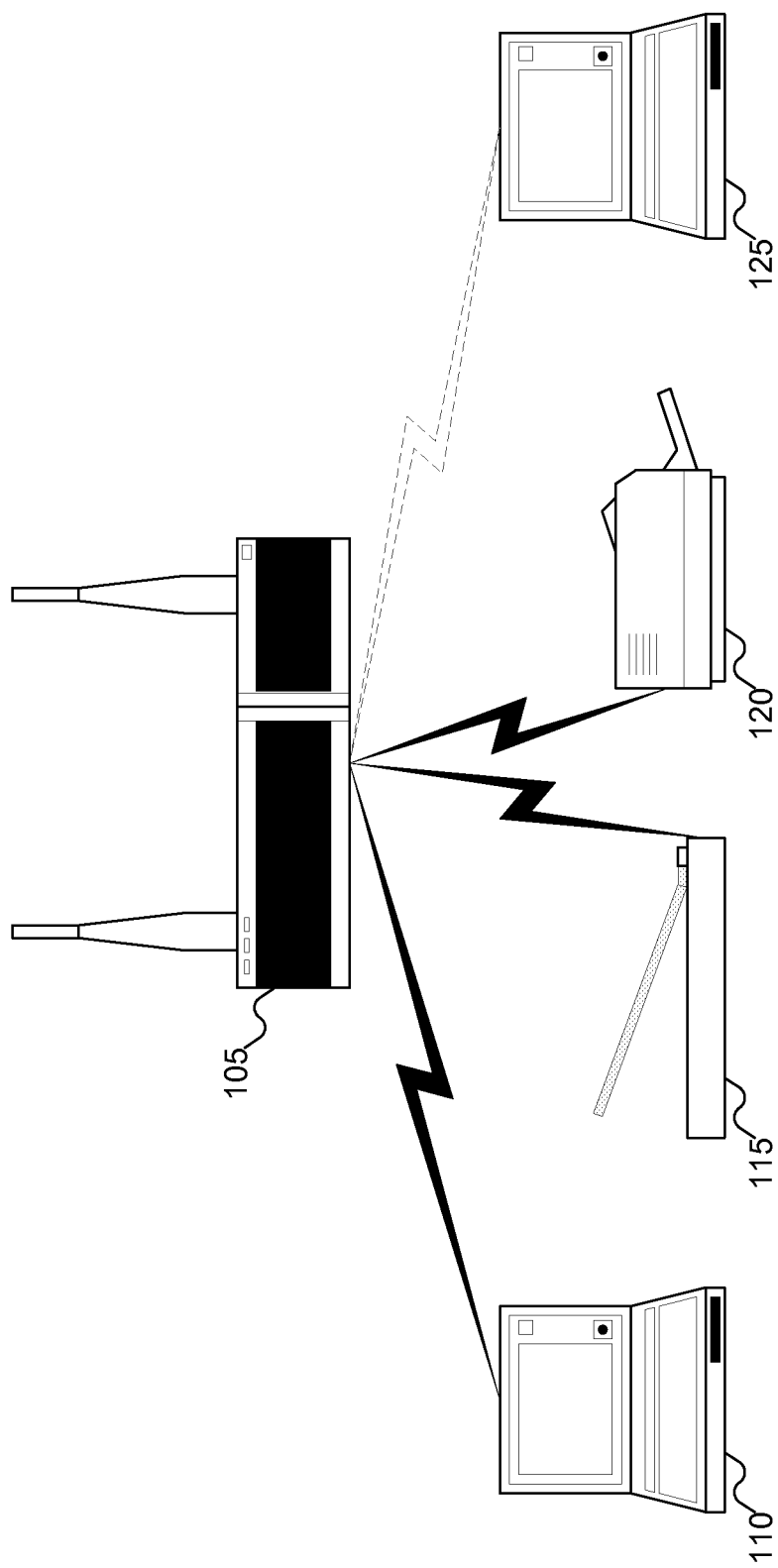
FIG. 1 shows a wireless access point connecting various devices, according to an embodiment of the invention.

FIG. 1 shows a wireless access point connecting various devices, according to an embodiment of the invention. The background description suggested that wired networks are inherently more secure than wireless networks (because an intruder would have to physically tap into the wires of the wired network), and embodiments of the invention are described with reference to a wireless access point. Nevertheless, a person skilled in the art will recognize that embodiments of the invention are just as applicable to wireline networks as to wireless networks. Thus, while the description below focuses on wireless networks and wireless access points, a person skilled in the art will recognize that embodiments of the invention may be adapted to any variety of access point, and that references to "wireless access point" are meant to encompass wireline access points as well.

In FIG. 1, wireless access point 105 is responsible for managing communications between all of the devices in the network. These devices include computer 110, scanner 115, and printer 120. A person skilled in the art will recognize that other devices may also be part of the network managed by wireless access point 105, and that there may be variations from the devices shown. For example, another device on the network might be a broadband router to manage a broadband connection, or a personal digital assistant (PDA). In addition, while computer 110 is shown as a notebook computer, a person skilled in the art will recognize that any other type of computing device may be substituted for the notebook computer.

Some devices on the network, like computer 110, generally control other devices, like scanner 115 or printer 120. Devices that control other devices are typically called control points. A person skilled in the art will recognize that a device may be both a control point and a responsive device. For example, if a file server were part of the network, and computer 110 issued a command to print a file on the file server, the file server would be both a control point and a responsive device: the file server would respond to computer 110, and control printer 120.

In contrast to computer 110, computer 125 is not a device added by the manager of the wireless network. Computer 125 is a computer that is hacking in to the wireless network. In other words, computer 125 is attempting to utilize the devices on the network, without the network owner's permission. Computer 125 might be a neighbor's computer, or it might be a computer owned by a warchalker, who has driven by and detected the wireless network. To distinguish computer 125 from legitimate control points, computer 125 is termed a rogue control point. As with computer 110, although computer 125 is shown as a notebook computer, computer 110 might be any device capable of acting as a control point.

Not shown in FIG. 1 is a security console. A security console is used to authenticate control points that are permitted to use devices on the network. One way a control point may be authenticated is by presenting its certificate to the security console. The security console is then responsible for determining which devices the control point may access, and which services on the permitted devices. Devices may request from the security console a list of authenticated control points, so that the devices may decide whether or not to reply to a particular request. The specifics of how the security console operates to authenticate control points and inform devices of authenticated control points are beyond the scope of this document.

Figure 2:
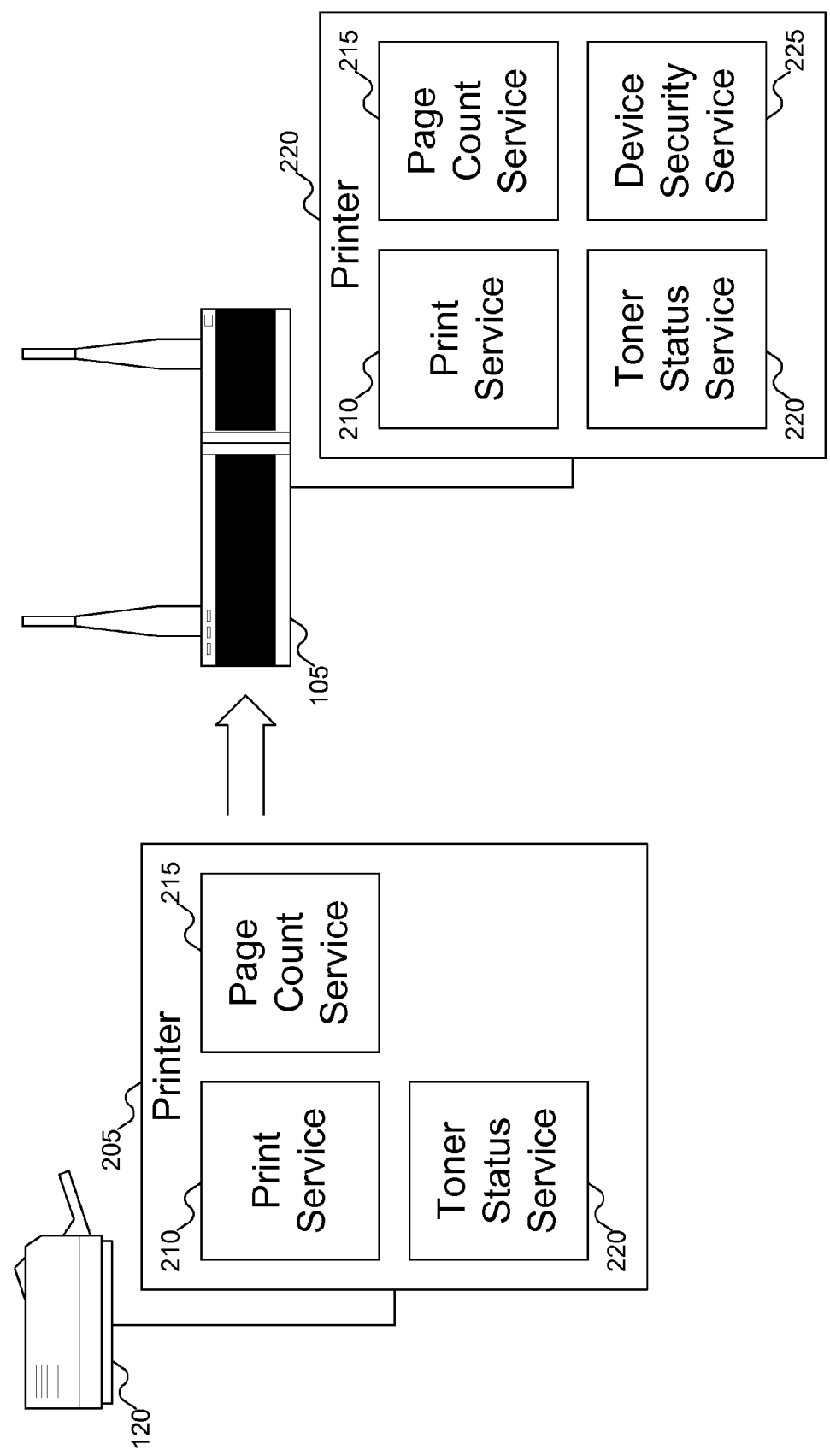
FIG. 2 shows the wireless access point of FIG. 1 adding a security service to a device advertisement, according to embodiments of the invention.

FIG. 2 shows the wireless access point of FIG. 1 adding a security service to a device advertisement, according to embodiments of the invention. In FIG. 2, printer 120 is shown advertising its services with advertisement 205, which include print service 210, page count service 215, and toner status service 215. Conspicuously absent from advertisement 205 is a security service.

To add security to the network without the device itself providing the security service, wireless access point 105 is shown in FIG. 2 forwarding advertisement 205 as advertisement 220. Wireless access point 105 adds device security service 225 to advertisement 220. As far as other devices are concerned, device security service 225 was part of advertisement 205, as originally broadcast by printer 120. The other devices neither know nor care that wireless access point 105 added device security service 225.

Although FIG. 2 shows wireless access point 105 adding device security service 225 to advertisement 205 on behalf of printer 120, a person skilled in the art will recognize that embodiments of the invention are not limited to device security services. That is, wireless access point 105 may add any security service to advertisement 205.

Because wireless access point 105 stands in the place of the various devices with respect to the use of the security service, wireless access point 105 is also responsible for verifying that control points making requests are authenticated for the device/service combination. Thus, wireless access point 105 may communicate with the security console to determine if the control point is authenticated for the requested device/service.

Figure 3:
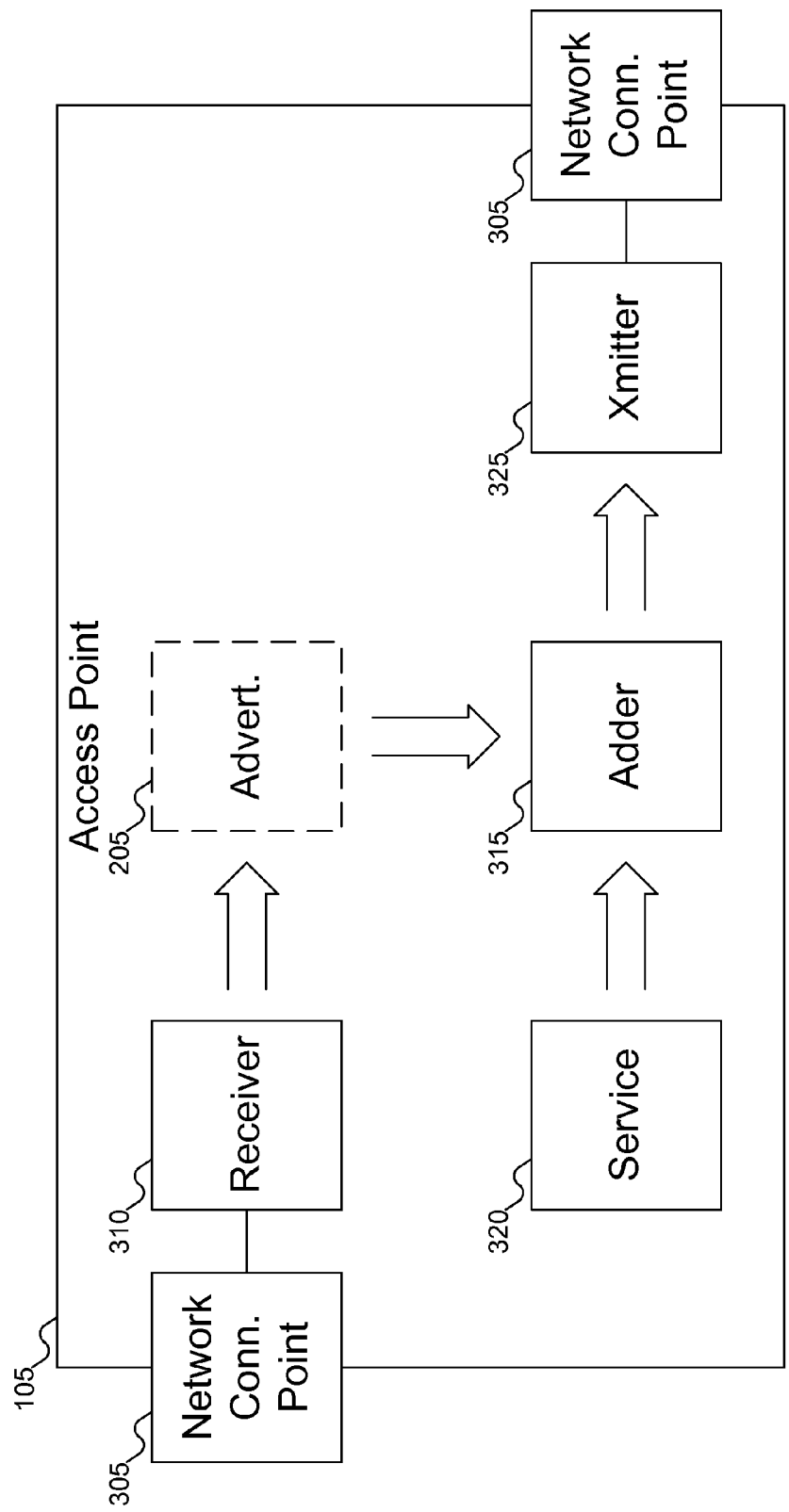
FIG. 3 shows elements of the wireless access point of FIG. 1 when supplementing a device advertisement, according to an embodiment of the invention.

FIG. 3 shows elements of the wireless access point of FIG. 1 pertinent to the advertisement stage, according to an embodiment of the invention. In FIG. 3, wireless access point 105 includes network connection point 305, which is used to establish connections with other devices on the network. For a wireless network, network connection point 305 may be a wireless antenna broadcasting on a frequency appropriate to the network; for a wireline network, network connection point 305 may be, e.g., an Ethernet RJ-45 jack. In addition, network connection point 305 may be a connection to a separate network, either via wireline or wireless. If network connection point 305 is a connection to a separate network (e.g., to a wide area network (WAN) or a global network, such as the Internet), services may be offered to a remote control point on the separate network.

A person skilled in the art will recognize that, although both network connection points in FIG. 3 are numbered 305, that the network connection points may be the same or different network connection points. Further, a person skilled in the art will recognize other possible forms network connection point 305 may take, that there may be more than one network connection point 305 on wireless access point 105, and that each network connection point 305 on wireless access point 105 may connect to different devices or networks.

Network connection point 305 is connected to receiver 310, which receives data over network connection point 305. Via receiver 310, wireless access point 105 receives advertisement 205. Adder 315 adds service 320 to advertisement 205 (resulting in new advertisement 220, not shown in FIG. 3), which may then be forwarded via transmitter 325 across network connection point 305 to other devices. A person skilled in the art will recognize that while network connection point 305 is shown twice in FIG. 3, different network connection points may be used to receive and transmit the device advertisements. For example, advertisement 205 might be received via a wireless network connection, and transmitted across a wireline network connection. In addition, the supplemented advertisement may be transmitted across multiple network connections. For example, if wireless access point 105 supports both the IEEE 802.11a and the IEEE 802.11g standard, then the supplemented advertisement may be transmitted according to both standards (in addition to transmission across a wireline network connection, if available).

Figure 4:
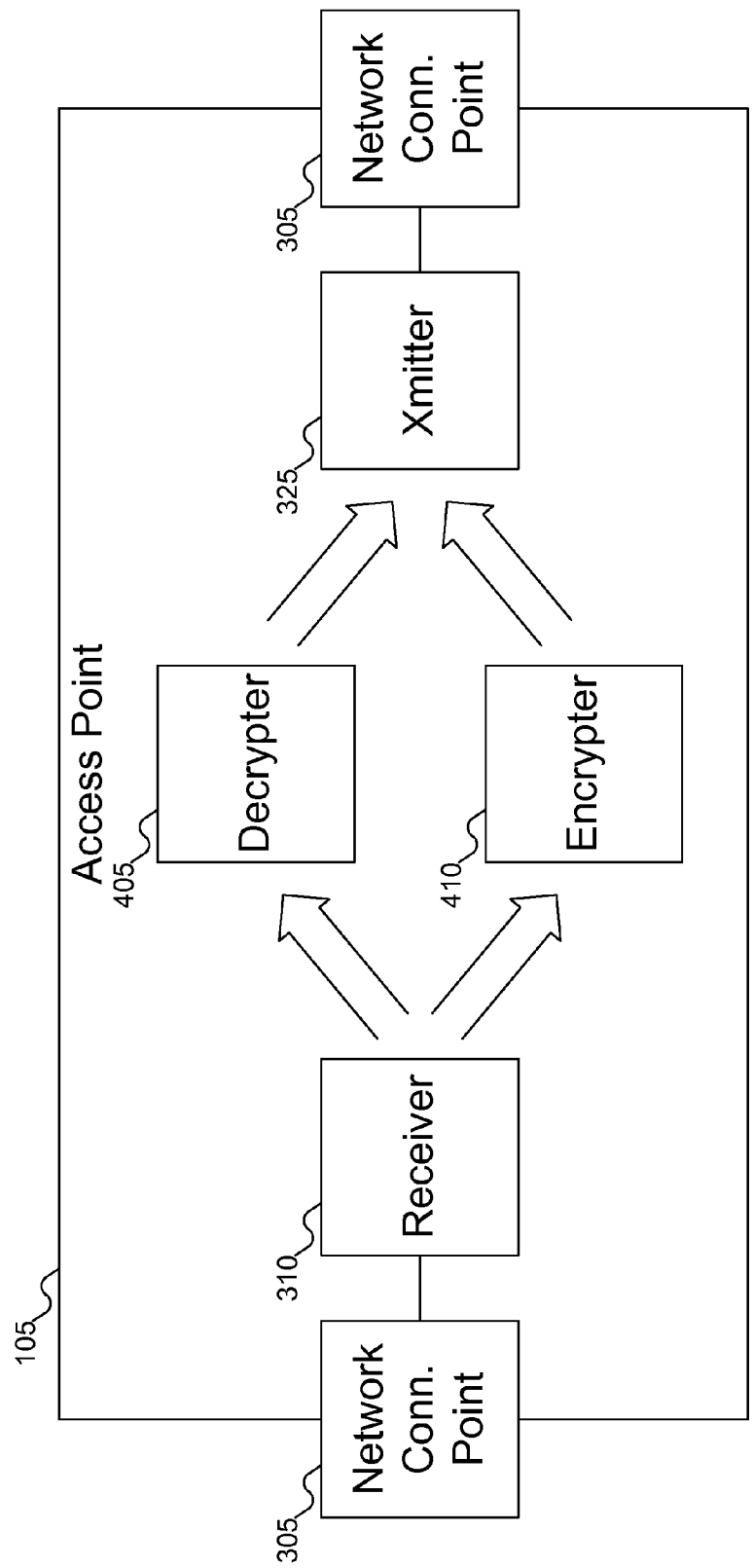
FIG. 4 shows elements of the wireless access point of FIG. 1 when providing a security service on behalf of a device, according to an embodiment of the invention.

FIG. 4 shows elements of the wireless access point of FIG. 1 when providing a security service on behalf of a device, according to an embodiment of the invention. In FIG. 4, it is assumed that some control point has decided to take advantage of the services offered by the device, and to utilize the security service added to the advertisement by wireless access point 105. As with FIG. 3, the multiple inclusions of network connection point 305 may represent the same or different connection points, as appropriate for communication with the various devices. In FIG. 4, receiver 310 receives a communication. If the communication comes from the control point (not shown in FIG. 4), then the communication is presumably encrypted according to the security service, added by wireless access point 105. The communication is routed to decrypter 405, which decrypts the message using the security service. The (unencrypted) communication may then be routed to the device using transmitter 325.

Alternatively, if the communication comes from the device, then the communication is presumably unencrypted. The communication is routed through encrypter 410, which encrypts the message using the security service. The (encrypted) communication may then be routed to the control point using transmitter 325.

Part of being able to use secure communications requires establishing a secure session between the control point and wireless access point 105. Although the control point thinks it is establishing a secure session with the device, in fact the control point is establishing the secure session with wireless access point 105. Although no details are shown, the secure session is established according to the standard parameters for the security service. For example, using the security service of the UPnP Device Security 1.0, the control point is identified and authenticated by wireless access point 105 before the requested service is decrypted and forwarded to the appropriate device.

Figure 5:
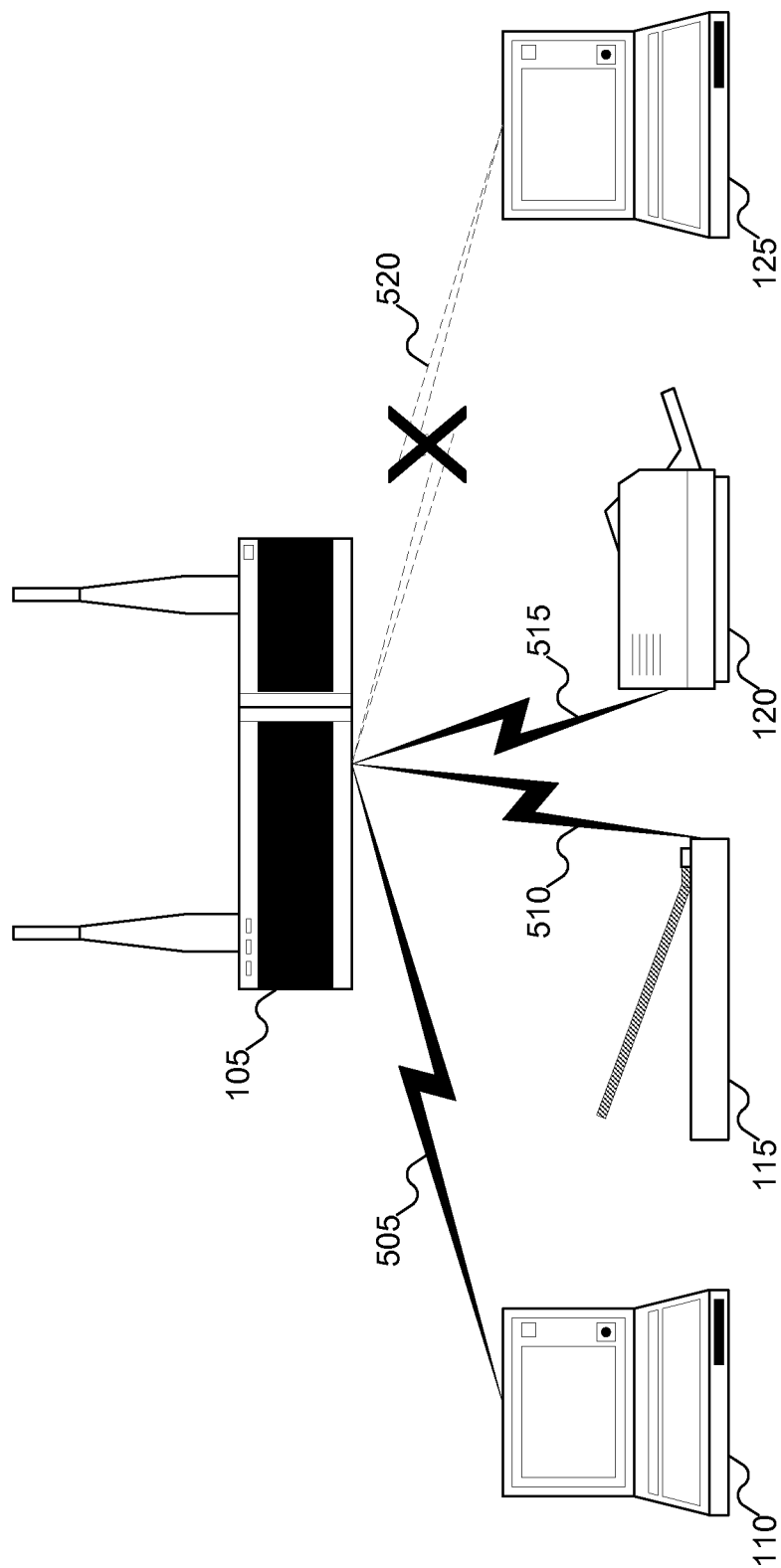
FIG. 5 shows the wireless access point of FIG. 1 controlling access to a device, according to an embodiment of the invention.

FIG. 5 shows the wireless access point of FIG. 1 controlling access to a device, according to an embodiment of the invention. In FIG. 5, computer 110 has requested a service from, say, scanner 115. Because the advertisement computer 110 receives indicates a security service, computer 110 establishes a secure session to utilize a service of scanner 115. Computer 110 communicates with wireless access point 105 using communication channel 505. Wireless access point 105 identifies and authenticates computer 110 as a legitimate control point, and forwards service requests to scanner 115 over communications channel 510. Similarly, computer 110 may request a service from printer 120, which wireless access point 105 may forward to printer 120 using communications channel 515.

Rogue control point 125, on the other hand, may make requests of services offered by scanner 115 or printer 120. But because wireless access point 105 may not identify and authenticate rogue control point 125, communications channel 520 may not be established, and wireless access point 105 will not forward any service requests to devices such as scanner 115 and printer 120.

Figure 6:
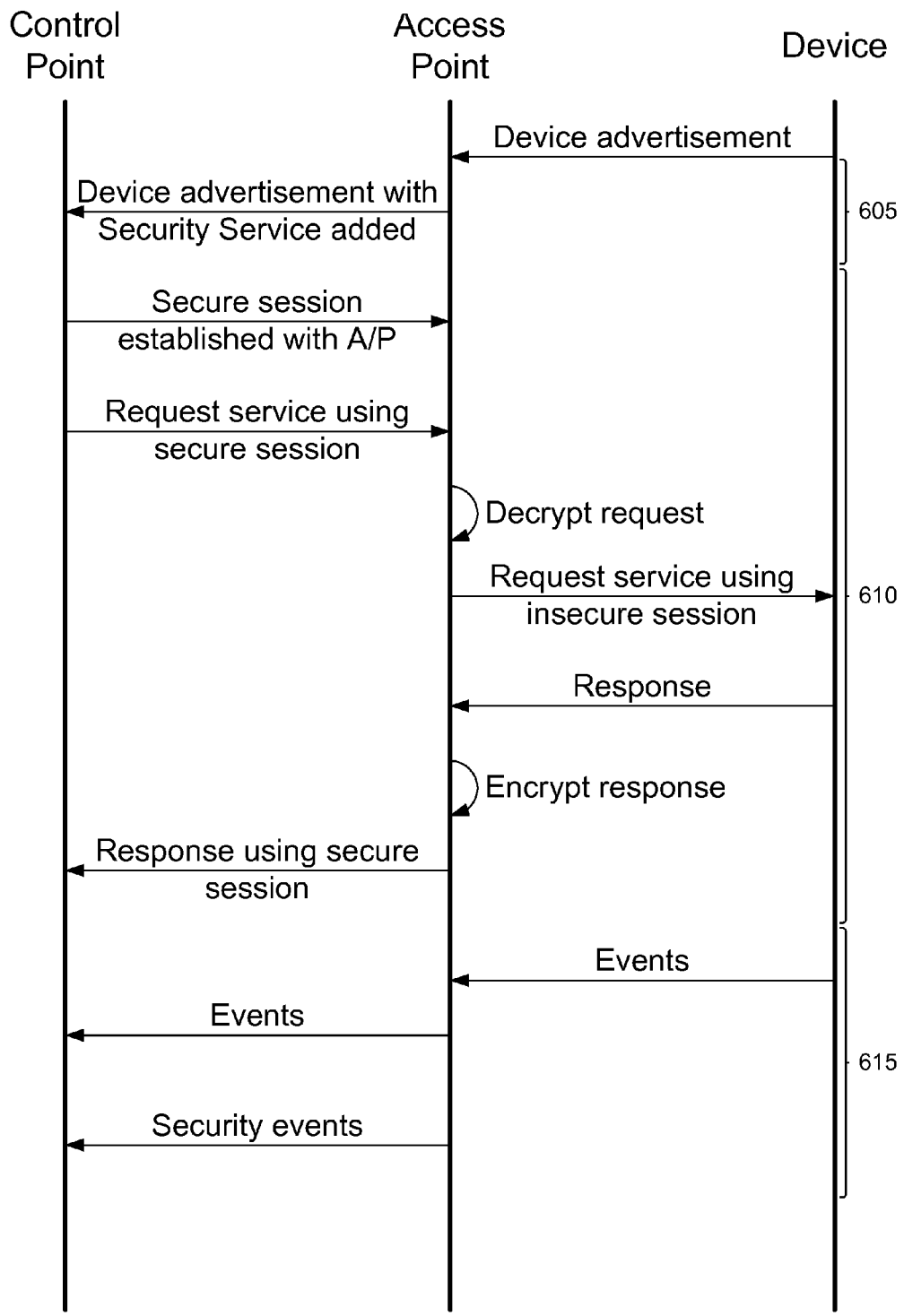
FIG. 6 shows a sequence of messages among a device, a control point, and a wireless access point in the system of FIG. 1, according to an embodiment of the invention.

FIG. 6 shows a sequence of messages among a device, a control point, and a wireless access point in the system of FIG. 1, according to an embodiment of the invention. Reading FIG. 6 from the top down, in device advertisement stage 605, the device broadcasts its advertisement. The wireless access point receives the advertisement, adds the security service, such as UPnP security service 1.0, and broadcasts the advertisement to other devices, such as the control point. During secure action request and response phase 610, the control point may request and establish a secure session with the wireless access point. Eventually, the control point sends a service request that uses the secure session. The wireless access point decrypts the request, and forwards an unencrypted request to the device. Any responses received from the device may be encrypted by the wireless access point and forwarded to the control point using the secure session.

In event phase 615, events triggered by the device are delivered to the control point. Similarly, any events triggered by the security service (which is being handled by the wireless access point) are delivered to the control point.

Figure 7A:
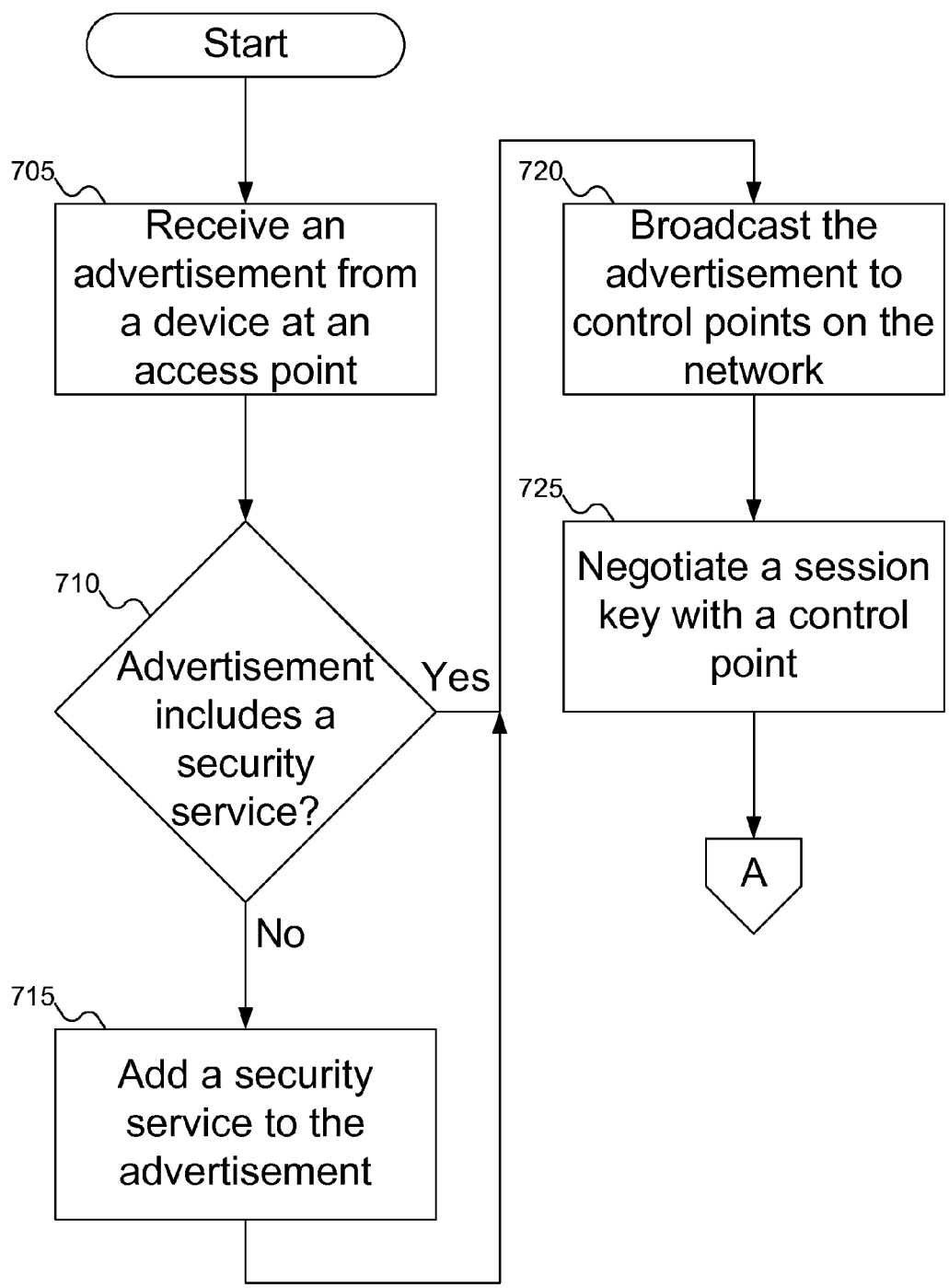
FIGS. 7A-7D show a procedure for using a wireless access point to add security to a device in the system of FIG. 1, according to an embodiment of the invention.

FIGS. 7A-7D show a procedure for using a wireless access point to add security to a device in the system of FIG. 1, according to an embodiment of the invention. In FIG. 7A, at block 705, the access point receives an advertisement from a device. At block 710, the access point verifies whether or not the advertisement includes a security service. If the advertisement does not include a security service, then at block 715 the access point adds a security service, such as UPnP security service 1.0. At block 720, the access point broadcasts the (supplemented) advertisement to control points on the network.

At block 725, the access point receives a request to negotiate a session key for the device, and negotiates the session key. As discussed above with reference to FIG. 1, this may involve a security console authenticating the control point's certificate, and the access point verifying that the control point is authorized to access both the device and the desired service. A person skilled in the art will recognize that before the access point may negotiate the session key, the control point is to be authenticated. But if the control point has been validly authenticated to the network, the access point may begin negotiating the session key without re-authenticating the control point.

At block 730 (FIG. 7B), the access point receives a request from a control point to use a service of the device. At block 735, the access point checks to see if the security service was added to the device advertisements.

If the security service was added to the device advertisements, then the request should be encrypted. At block 740 (FIG. 7C), the access point decrypts the request. At block 745, the access point verifies whether the message was properly encrypted. If not, then at block 750 the access point rejects the request, and processing ends. Otherwise, at block 755, the access point determines the session key used by the control point in the request. At block 760, the access point determines if the session key is still valid. If not, then processing continues at block 750 with the access point rejecting the request. Otherwise, the request has been properly made and issues from an authorized control point.

Figure 7B:
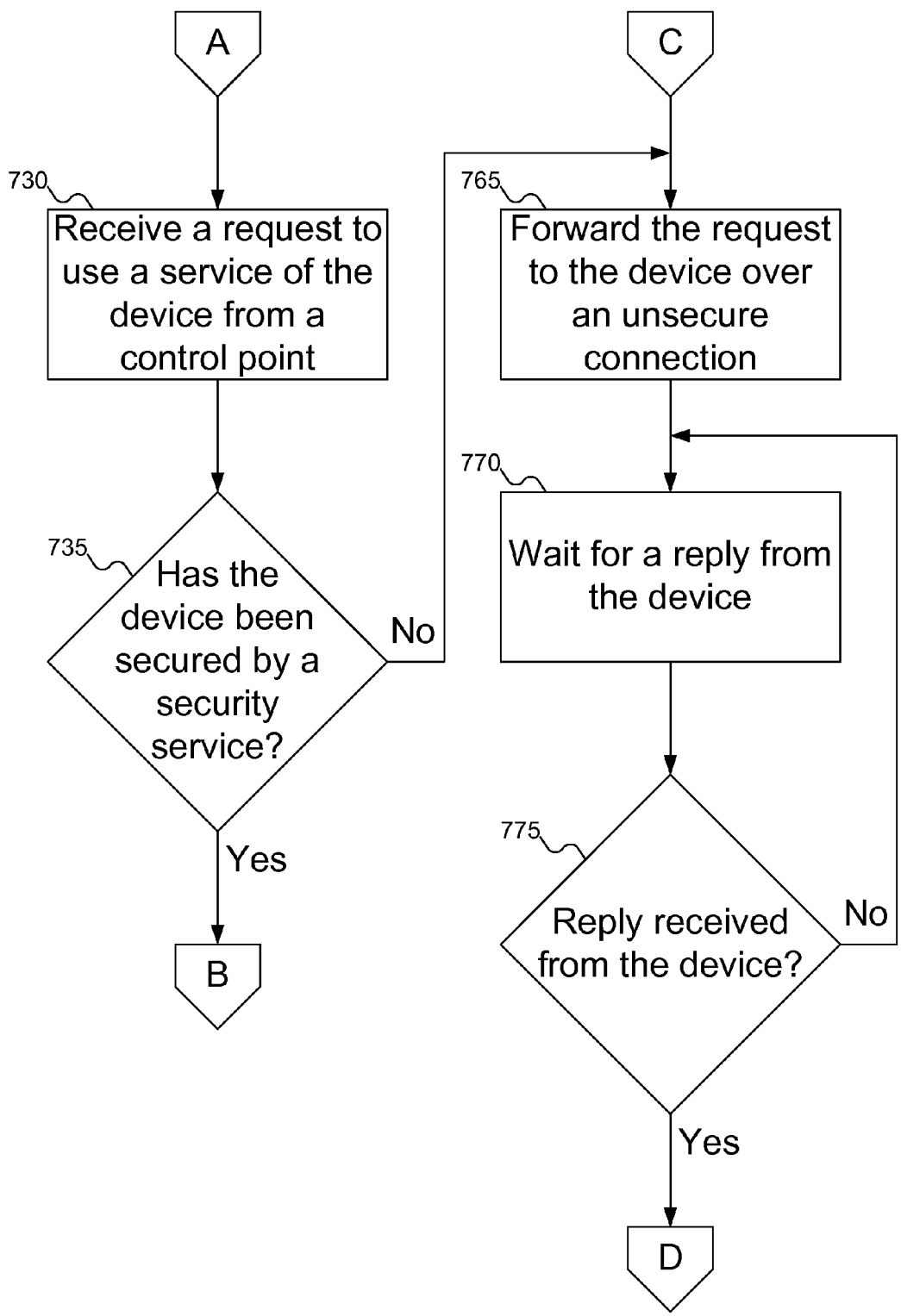

Processing continues at block 765 in FIG. 7B, with the access point forwarding the request to the device. (Note that if the security service was not added to the device advertisement, then the access point forwards the request to the device without performing the checks in FIG. 7C.) At block 770 (FIG. 7C), the access point waits for a reply from the device that did not have security. When a reply is received (block 775), then at block 780 the access point checks to see if the security service was added to the device advertisements (block 785 in FIG. 7D). If the security service was added to the device advertisements, then at block 780 the reply is encrypted using the security service, and at block 790 the reply (encrypted or otherwise) is forwarded to the control point.

Figure 7C:
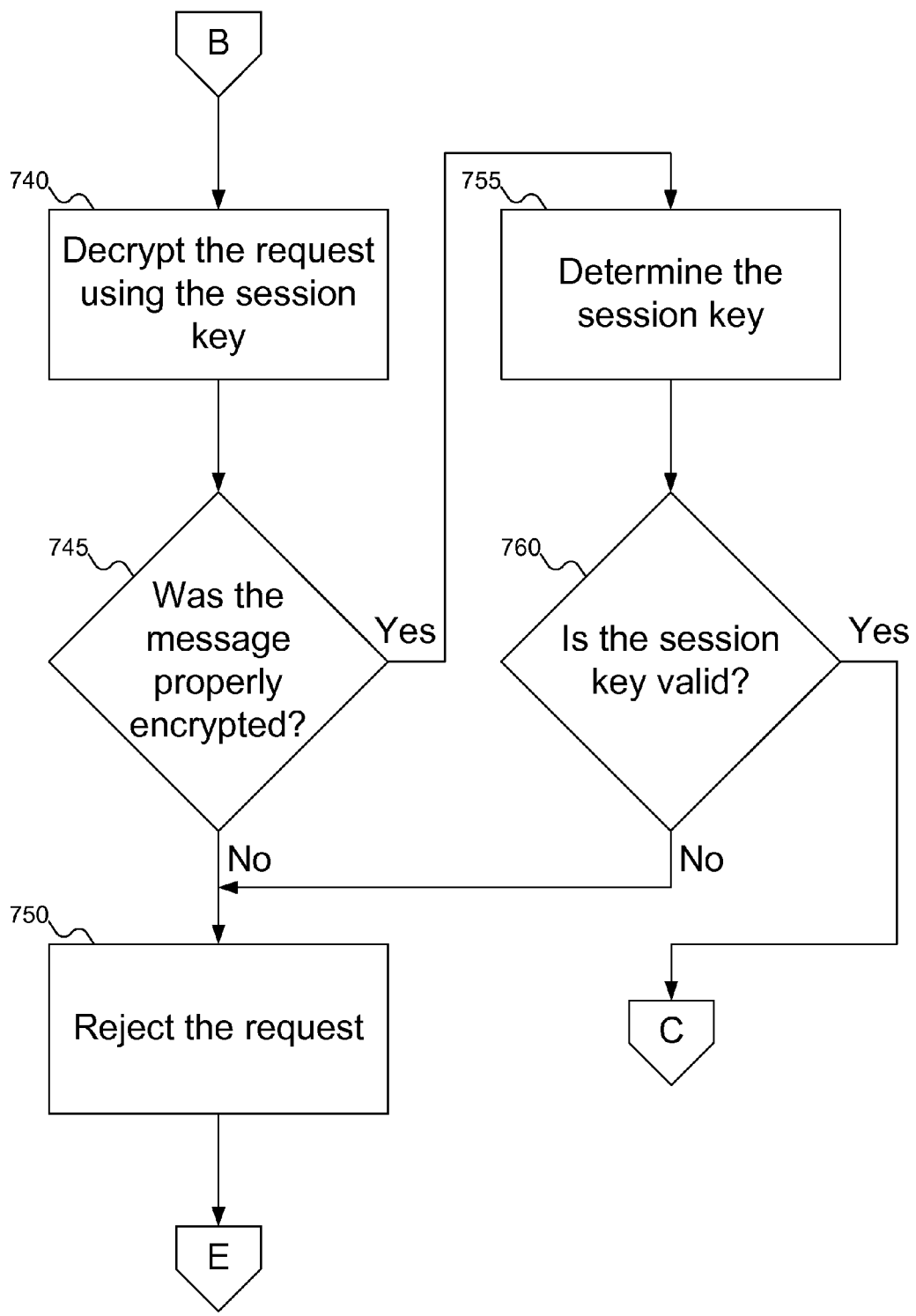
Figure 7D:
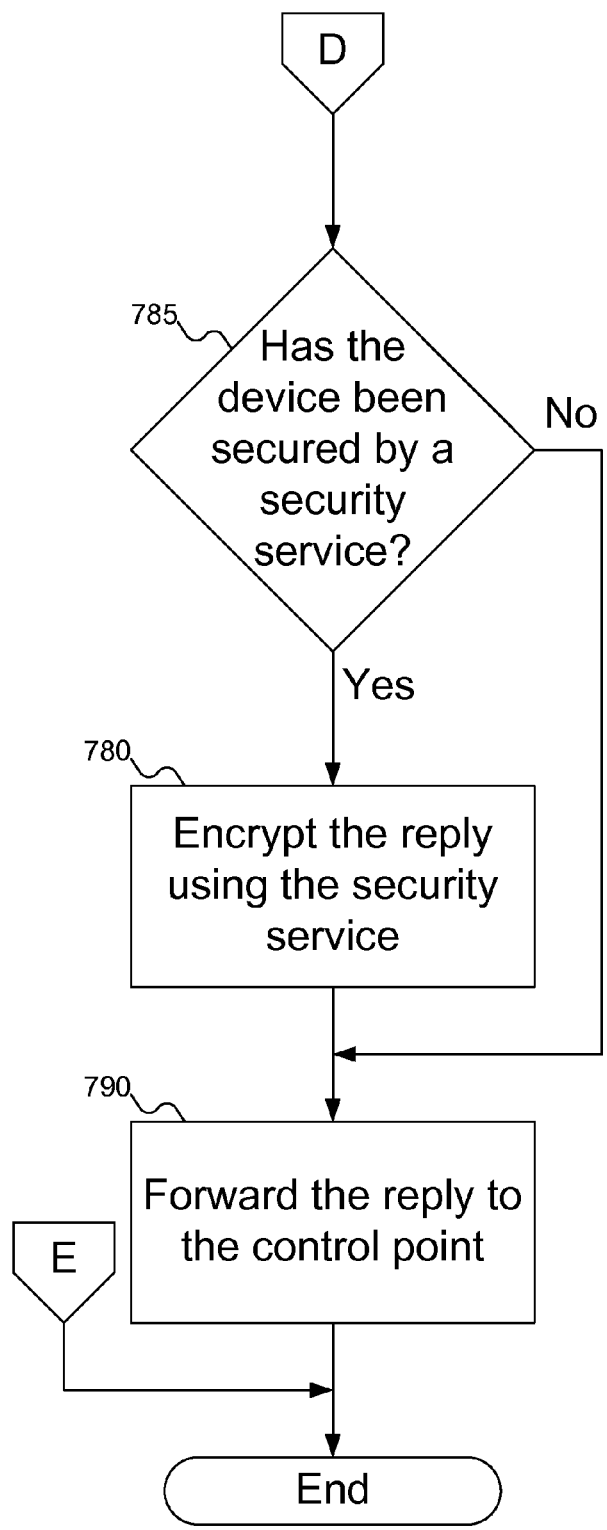

A person skilled in the art will recognize that although blocks 730-790 of FIGS. 7B-7D describe the control point as making a single request and the device making a single response, the flowchart may be adapted to support multiple messages between the control point and the device, or no messages beyond the initial request (not even a reply from the device). Because of the risk of a rogue control point attempting to communicate with the device, each message received by the access point from the control point is processed according to blocks 740-750 of FIG. 7C, although the control point should not need to be re-authenticated for each message.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Such embodiments may also be referred to as program products. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may also be used in conjunction with communications media such antennas, wires, optical fibers, microwaves, radio waves, and other electromagnetic or optical carriers. Associated data may be delivered over transmission environments, including physical and/or logical networks, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "in one embodiment" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An access point, comprising:
   at least one network connection point;
   control logic to provide a first service;
   a connector to establish a secure connection with a control point using said first service;
   a receiver to receive a notification from a device via the network connection point, the notification including a second service, wherein the receiver is operative to receive a request to utilize said second service from said control point using the secure connection;
   an adder to add said first service to said notification;
   a decrypter to decrypt said request to utilize said second service; and
   a transmitter to transmit said notification including said first service via the network connection point, wherein the transmitter is operative to forward said decrypted request to said device.

2. An access point according to claim 1, wherein the at least one network connection point includes a wireless network connection point.

3. An access point according to claim 1, wherein said first service includes a security service.

4. An access point according to claim 1, wherein:
   the receiver is operative to receive a reply from said device;
   the access point further comprises an encrypter to encrypt said reply; and
   the transmitter is operative to forward said encrypted reply to said control point.

5. An access point according to claim 1, further comprising an authenticator to authenticate said control point.

6. An access point according to claim 1, wherein:
   the access point further comprises a second network connection point; and
   the transmitter is operative to transmit said notification including said first service via the second network connection point.

7. A system, comprising:
   a device, including:
      at least a first network connection point;
      control logic to provide a first service; and
      a first transmitter to transmit a notification including said first service via the at least first network connection point;
   an access point, including:
      at least a second network connection point;
      a second service;
      a receiver to receive said notification from the device via the at least second network connection point;
      an adder to add the second service to said notification; and
      a second transmitter to transmit said notification including the second service via the at least second network connection point;

a control point, including:
- at least a third network connection point; and
- a second receiver to receive said notification from the access point via the at least third network connection point;

a communications medium connecting the at least first network connection point, the at least second network connection point, and the at least third network connection point; and a connector to establish a secure connection with the control point using the first service across the communications medium, wherein the first receiver is operative to receive a request to utilize said second service from said control point using the secure connection.

8. A system according to claim 7, wherein:
the access point further comprises a decrypter to decrypt said request to utilize said second service, and
the second transmitter is operative to forward said decrypted request to said device.

9. A system according to claim 7, wherein:
the at least first network connection point includes a first wireless network connection point;
the at least second network connection point includes a second wireless network connection point; and
the communications medium supports wireless communication between the first wireless network connection point and the second wireless network connection point.

10. A system according to claim 7, wherein:
the first receiver is operative to receive a reply from said device;
the access point further comprises an encrypter to encrypt said reply; and
the second transmitter is operative to forward said encrypted reply to said control point.

11. A system according to claim 7, further comprising an authenticator to authenticate said control point.

12. A system according to claim 7, wherein:
the access point further comprises a third network connection point; and
the transmitter is operative to transmit said notification including said first service via the third network connection point.

13. A system according to claim 7, wherein said second service includes a security service.

14. A method for using a device via an access point, comprising:
receiving a notification from a device, the notification including a first service;
adding a second service to the notification;
broadcasting the notification including the second service to at least a control point;
establishing a secure session with the control point;
receiving a request to utilize the first service and the second service from the control point;
receiving the request for the first service from the control point using the secure session, wherein receiving the request for the first service from the control point using the secure session includes decrypting the request for the first service using the second service;
providing the second service on behalf of the device;
forwarding the request for the first service to the device as if the secure session had not been established.

15. A method according to claim 14, wherein:
adding a second service includes adding a security service to the notification.

16. A method according to claim 15, wherein:
broadcasting the notification includes broadcasting the notification including the security service to at least the control point;
receiving a request includes receiving the request to utilize the first service and the security service from the control point; and
providing the second service includes providing the security service on behalf of the device.

17. A method according to claim 16, wherein providing the security service includes authenticating the control point.

18. A method according to claim 15, further comprising:
receiving a reply from the device;
encrypting the reply using the security service; and
forwarding the reply to the control point via the secure session.

19. A method according to claim 14, further comprising broadcasting a request for the notification from the device.

20. A method according to claim 14, wherein:
receiving a notification includes receiving a wireless notification from the device, the wireless notification including the first service;
broadcasting the notification includes broadcasting the wireless notification including the second service to at least the control point;
receiving a request includes receiving a wireless request to utilize the first service and the second service from the control point; and
forwarding the request includes wirelessly forwarding the wireless request for the first service to the device.

* * * * *